Oct. 20, 1931. F. KLOPP 1,828,050

GUARD

Filed March 6, 1930

Patented Oct. 20, 1931

1,828,050

UNITED STATES PATENT OFFICE

FRIEDRICH KLOPP, OF WALD, GERMANY

GUARD

Application filed March 6, 1930, Serial No. 433,776, and in Germany August 15, 1929.

This invention relates to an arrangement of the protecting hood for the belt drive of machine tools, in which one end of the driving axle is journaled in an external bearing of the machine body.

The invention consists in that the external bearing is fitted with a bushing on which the protecting hood is mounted and fixed in that by means of a ring nut the bushing is tightened and the protecting hood clamped between a collar of the bushing and the external bearing. The external bearing serves therefore at the same time as holder for the protecting hood which can be easily adjusted in accordance with the direction of the driving belt.

Figure 1:
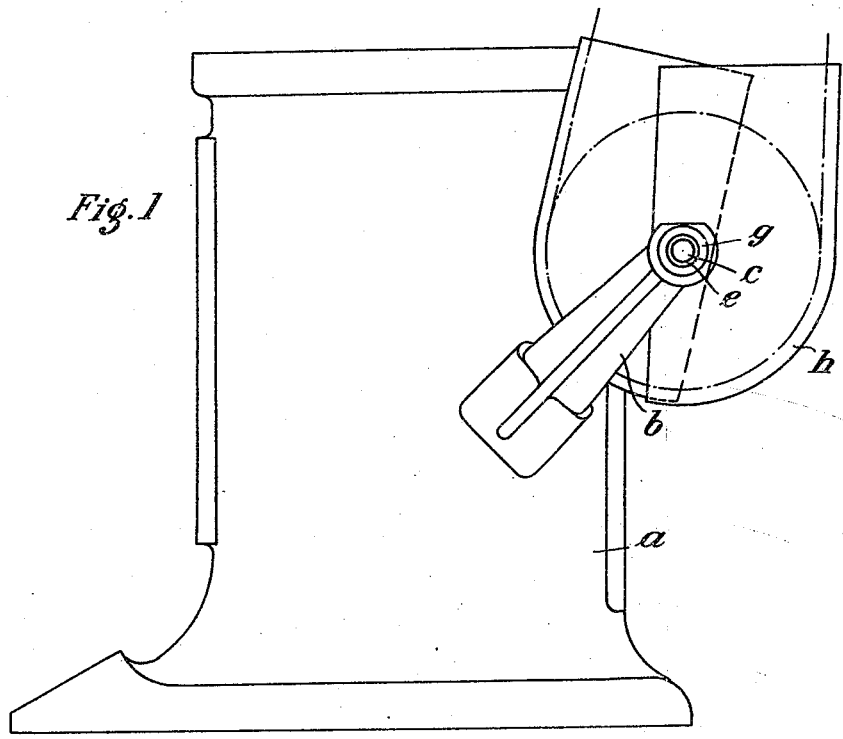
Figure 2:
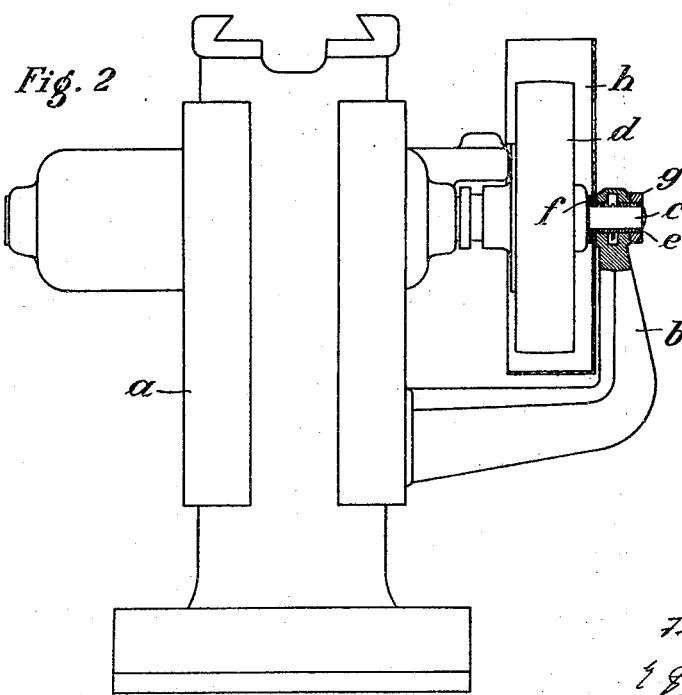

An embodiment of the invention is illustrated by way of example in the accompanying drawings in which:

Fig. 1 is an elevation and
Fig. 2 a section.

On the machine body $a$ the external bearing $b$ for the axle $c$ of the driving pulley $d$ is fixed. In the external bearing $b$ a bushing $e$ is inserted, which has, on the inner side of the external bearing, a collar $f$ and, on the outer side of the external bearing, a ring nut $g$. The protecting hood $h$, which may be made in one piece or composed of two halves, is placed on the bushing $e$ between the external bearing $b$ and the collar $f$ of the bushing. By means of the ring nut $g$ the bushing $e$ can be tightened so that the protecting hood $h$ is securely clamped between the external bearing $b$ and the collar $f$ of the bushing $e$. The position of the protecting hood $h$ can be adjusted in accordance with the actual direction of the driving belt.

I claim:

A protecting device for the belt drive of a machine having a driving axle carrying a belt pulley and an external bearing for said driving axle fixed to said machine, comprising a bushing in said external bearing, a collar on the inner end of said bushing, a hood on said bushing between said collar and said external bearing, and a ring nut on the outer end of said bushing adapted to move said bushing longitudinally to clamp said hood between said collar and said bearing.

In testimony whereof I affix my signature.

FRIEDRICH KLOPP.